March 3, 1953  J. E. MONTGOMERY  2,629,938
METHOD AND APPARATUS FOR TREATING SOLIDS
Filed March 3, 1949  2 SHEETS—SHEET 1

Inventor
JOHN E. MONTGOMERY.
By James E. Toomey
agt.
Atty.

March 3, 1953      J. E. MONTGOMERY      2,629,938
METHOD AND APPARATUS FOR TREATING SOLIDS
Filed March 3, 1949      2 SHEETS—SHEET 2
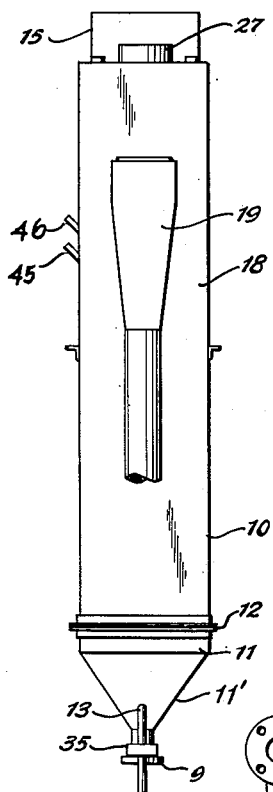
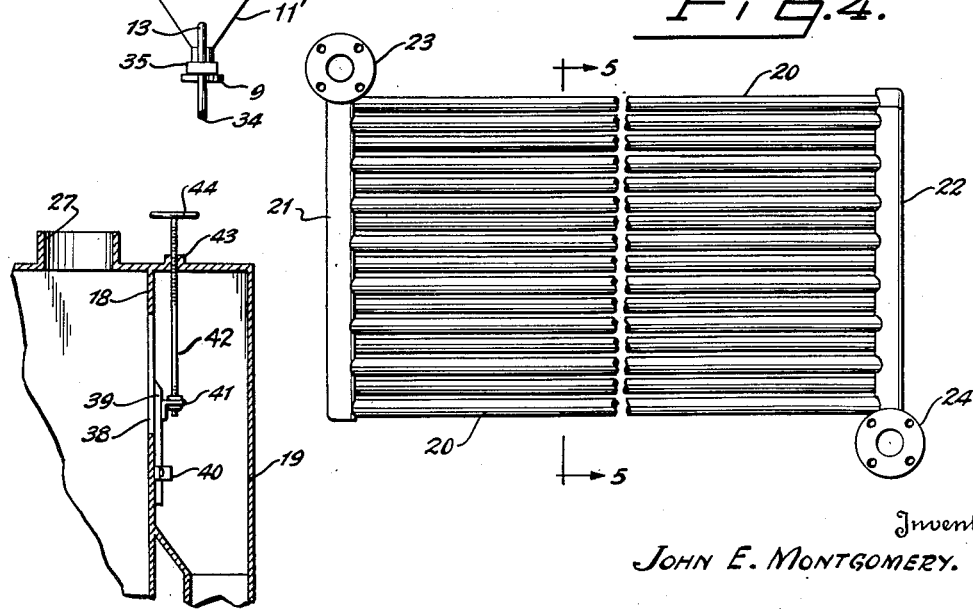
Inventor
JOHN E. MONTGOMERY.
By James E. Toomey
Agt.
Atty.

Patented Mar. 3, 1953

2,629,938

UNITED STATES PATENT OFFICE 2,629,938

METHOD AND APPARATUS FOR TREATING SOLIDS

John E. Montgomery, Baton Rouge, La., assignor to Kaiser Aluminum & Chemical Corporation, a corporation of Delaware Application March 3, 1949, Serial No. 79,345

12 Claims. (Cl. 34—10)

This invention relates to an improved process and apparatus for effecting indirect heat exchange with particulate solids. More particularly, the invention relates to a process and apparatus for effecting drying of wet granular or finely divided solids by means of indirect heat exchange wherein the solids being treated are maintained in a fluidized state, that is, suspended in a gas in the form of a dense turbulent body resembling a boiling liquid.

In many industrial processes and operations, it is necessary to remove the water content of wet granular or pulverulent solids before subjecting the material to further treatment or before transporting the material, if processing is completed. This is commonly accomplished by heating the material to dry the same by evaporation of a desired amount of the moisture content of such solids. The heating may often be accomplished by direct heat exchange wherein the material is contacted with heated gases, such as stack gases, in suitable stationary vessels or preferably in rotary kilns to provide a better degree of contact between the discrete particles of the solid and the gaseous heating medium. In other instances due to reactivity of the material, or the desire to avoid contamination, indirect heat exchange is utilized to effect drying of the wet solids. This may also be accomplished in rotary drums or driers for agitating the solids thereby promoting more efficient heat exchange. However, all such processes and apparatus have certain limitations in regard to temperature control, uniformity of temperature, and efficiency of heat transfer.

It is a primary object of the present invention to provide an improved method and apparatus for effecting indirect heat exchange with finely divided solids characterized by the facility of close temperature control and uniformity of temperature in the material being heated.

A further object of the invention is to provide an improved process and apparatus for effecting indirect heat exchange with pulverulent solids in which an optimum coefficient of heat transfer is obtained and processing time is substantially curtailed.

A more specific object of the invention resides in the provision of a method for drying wet solids finely divided in regard to ultimate particle size by indirect heat exchange wherein the surface presented for heat transfer is enormous, due to the fluent condition of the solids.

A further specific object is the provision of indirect heat exchange apparatus for continuously drying wet solids finely divided as to discrete particle size characterized by means to maintain the solids in a fluidized state, and to cause the solids to flow in contact with the heating surfaces in a restricted tortuous path between the locus of the feed and the discharge point.

Another specific object is to provide apparatus for continuously drying wet pulverulent solids wherein uniformity of temperature, optimum temperature control and reduction of drying time is realized, and in which a superior coefficient of heat transfer is attained.

A more specific object of the invention is to provide a method and apparatus for continuously drying finely divided wet hydrated solids which contain both free moisture and combined water whereby substantially complete elimination of the free moisture content is effected while avoiding any calcination or removal of water of crystallization.

A further specific object of the invention is to provide a method and apparatus for continuously drying wet solids of a desired range of ultimate particle sizes without the formation of an objectionable proportion of fines.

A further specific object of the invention is to provide a method and apparatus for controlling the level of the fluent bed of solids within a fluidizing zone relative to the heat transfer surfaces and thus to provide a zone of substantial depth for disintegration of wet and lumpy clods of material fed to the apparatus prior to contact with the heat transfer surfaces.

The improved process of the present invention generally comprises fluidizing finely divided solids in a confined zone by contacting with a continuous flow of gaseous medium at velocities sufficient to maintain a dense turbulent body of solids, feeding finely divided untreated solids to the zone, causing the fluidized solids to flow in a tortuous path through the confined zone from the infeed to the discharge point thereof, heating the fluidized solids by indirect heat exchange while flowing in a tortuous path, and discharging the dried or heated solids from the zone at the end of the tortuous path.

Apparatus of the invention particularly suitable for carrying out the process herein disclosed generally comprises a vessel adapted to hold fluidized finely divided solids, means for introducing a fluidizing gaseous medium into the vessel to maintain therein a dense turbulent body of fluidized solids, means for feeding finely divided untreated solids into one section of the vessel, preferably above the level of the body of solids, means for withdrawing treated finely divided solids in another section of the vessel and preferably located at the level of the body of fluidized solids, baffle means extending downwardly from above the level of fluidized solids into the lower portion thereof and separating the two sections of the vessel thereby causing the fluidized solids to flow in a tortuous path, and a plurality of indirect heat exchange surfaces positioned within both sections of the vessel and occupying a substantial portion of the tortuous flow path for heating the fluidized solids.

The method and apparatus further comprise, as a preferred embodiment, the disposition of the heat transfer surfaces within the vessel in such relationship that the flow of fluidized solids in the heating zone is divided into a series of confined or narrow passages in respect to the tortuous path thereof through the vessel. This arrangement of the heat transfer surfaces, which preferably comprise tubes carrying a suitable fluid heat exchange medium, provides a means whereby the tortuously flowing material is at all times in intimate heat exchange relation with the heating medium. The heating tubes are preferably arranged as a plurality of closely spaced vertical banks extending longitudinally through both sections of the vessel and well below the level of the dense turbulent body of fluidized solids. These banks occupy a major portion of the transverse space within the lower portions of both sections of the vessel, thus dividing the tortuous flow of material into several narrow streams. On the other hand, however, the spacings between individual tubes in a given bank constitute communicating passages between the streams and permit lateral movement of fluidized particles between the several passages, thus eliminating impedance to movement of particles and increasing the number of particle contacts with heating surfaces per unit of time.

The above described construction, and arrangements of the apparatus and manner of effecting the process provide for a close control of temperature and a uniformity of temperature throughout the heating zone. An extremely high heat transfer coefficient, that is, a substantially instantaneous heat transfer throughout the body of fluidized solids, is effected because of the extremely rapid rate of circulation or movement of the teetering bed of fluidized solids. The transfer of heat between the fluidized solids and the heat transfer surfaces is at a very high rate due to the innumerable contacts of particles in the everchanging body of solids with the heating surfaces. This is greatly augmented by reason of the plurality of restricted passages for the fluidized solids in the tortuous flow path through the heating zone formed by the arrangement of the heating tubes. Since the heat transfer surfaces are permanently situated within the fluent bed and as a consequence of the high efficiency achieved in heat transfer, in a typical embodiment of the invention only about one-tenth as much footage of heating tubes is required as in conventional driers of equal capacity.

Control of the temperature of the heat exchange medium within the tubes is easily attained, and accurate control of the temperature of the material being heated is thus provided by reason of the extreme agitation of the finely divided solids which causes immediate and uniform heat transfer.

The invention is particularly applicable to the drying of wet hydrated finely divided solids wherein it is desired to effect a complete elimination of the free moisture content, while avoiding any partial calcination or removal of water of crystallization. In view of the close temperature control and uniformity of temperature attainable, any local overheating and consequent partial calcination is completely avoided.

An important and particularly advantageous feature of the method and apparatus applied to the drying of solids is the provision of a coherent solids disintegration zone within the fluidizing vessel.

Even relatively small amounts of free moisture, for example 8%, in the solids charged to the fluidized solids drier causes the particles of the solids to cohere in lumps or clods. This lumping or clodding of the moist solids is markedly increased upon contact with heated surfaces, such as steam pipes and the like. This substantial consolidation of solids particles prevents proper disintegration of the solids into their utimate size necessary for proper fluidization even in the presence of the fluidizing medium. These coherent lumps or clods harden and accumulate on and between the hot surfaces. As a consequence of such particle consolidation, localized areas of the bed of fluidized solids become immobilized and the remainder of the bed is subjected to great disturbance incident to passage of an excessive volume of fluidizing medium therethrough. In effect, fluidizing velocities in the mobile parts of the bed are exceeded, and apparent lifting velocities are set up, which cause excessive entrainment of solids in the gaseous fluidizing medium resulting in undue dust losses. The efficiency and capacity of the drier is adversely affected and quality of the drier product is impaired.

Substantially complete elimination of this problem has been realized by the present invention when the charging stock consists of wet coherent solids having sufficient moisture content to cause such consolidation of solids and isolating of parts of the heating surfaces. The fluidized bed is maintained at a depth within the vessel appreciably greater than that of the heating surfaces. In other words, the level A (shown in Fig. 1) of the bed of fluidized solids is maintained at a height appreciably above the heating surfaces and the wet solids are fed to the top of the bed. Thus, the portion of the bed from the level thereof to the topmost heating surfaces constitutes a disintegration zone for the wet coherent solids prior to contact with the heating surfaces.

In this disintegration zone the lumps or agglomerates of the wet solids are effectively broken down into discrete particles due to the extreme agitation of the previously formed discrete particles in this portion of the fluidized bed. As flow of the fluidized solids progresses through the tortuous path, the particles move downwardly from the disintegration zone into the zone occupied by the heating surfaces. In this manner, the drier operates at optimum efficiency and capacity, and uniform fluidization throughout the solids bed is realized.

As the discrete fluidized particles are dried in heating zone, they exhibit no tendency to reform coherent lumps or agglomerate.

Thus, the dried hydrated solids are discharged in the desired particle size and are characterized by their free flow property. A specific illustration of this application is described herein below with reference to the drying of wet alumina trihydrate.

The method and apparatus herein described may be used advantageously with finely divided solids over a wide range of particle sizes, for example, from a few microns to about 10 mesh. However, the range of sizes for a given body of solids being treated is limited by the particular gas velocity at which lifting or entrainment of the smallest particles and fluidizing of the largest particles occur. This range varies directly with increasing average particle size for solids of a given density. Suitable fluidizing gas velocities may be readily determined for solids of a given average particle size and density.

The method and the apparatus of the invention is described in greater detail with reference to the accompanying drawings which are merely illustrative of a preferred embodiment of the invention and are not to be construed as a necessary limitation thereof, in which, Figure 1 is a side elevation of the fluidized solids heating vessel or drier with parts broken away showing the top in vertical section;

Figure 3 is an end elevation of the vessel shown in Figure 1;

Figure 4 is a side elevation of the heating tube banks and headers;

Figure 5 is an enlarged end elevation showing the heating tube banks and headers;

Figure 6 is an enlarged fragmentary elevation with parts broken away of a modified discharge arrangement for controlling the bed level.

Figure 1:
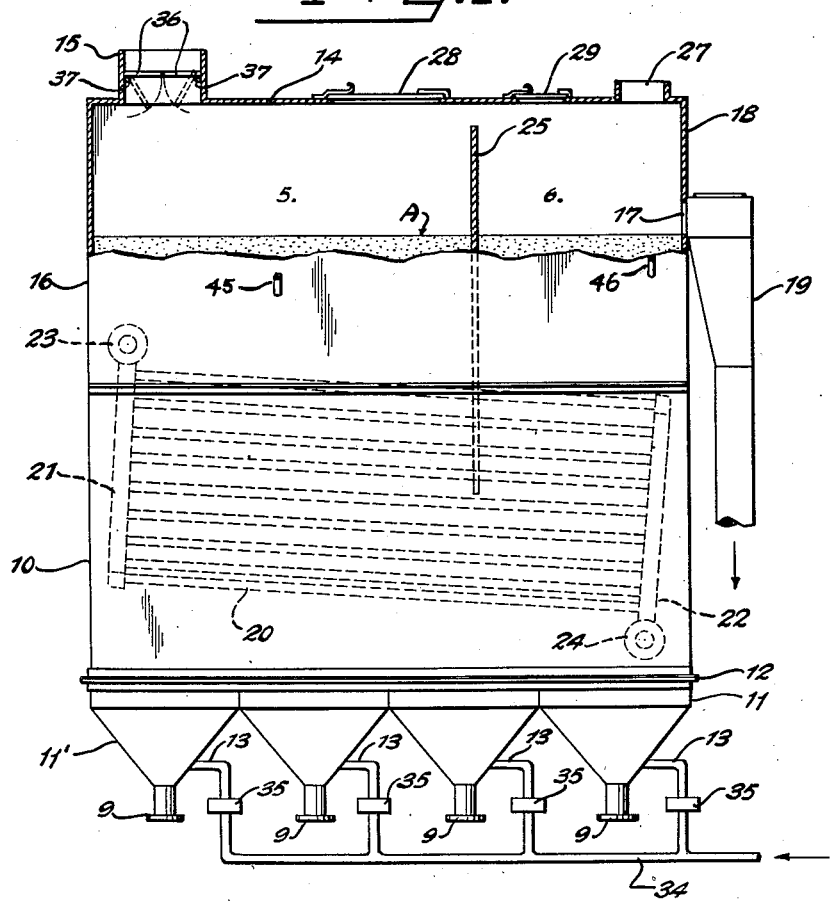
Figure 2:
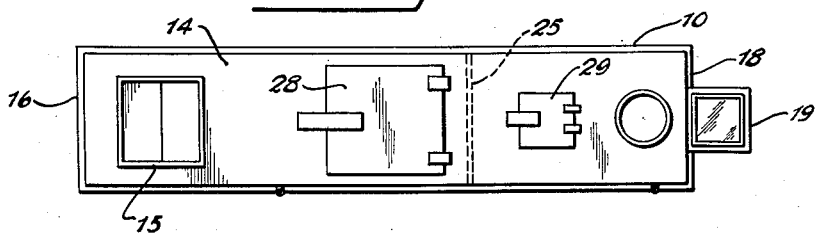
Figure 2 is a top plan view of the vessel shown in Figure 1.

Referring in particular to Figures 1, 2 and 3 of the drawings, the drier or heating vessel 10 is shown as a vertical closed vessel of elongated rectangular cross-section, which is provided with a bottom portion 11, preferably comprising a plurality of separated substantially tetrahedral gas chambers 11'. Interposed between the vessel 10 and bottom 11 is a perforated baffle or plate 12 extending across all of the gas chambers and provided with a plurality of small holes throughout its entire area through which the fluidizing gaseous medium supplied to the chambers is uniformly and distributively introduced into the material or granular solids being treated in vessel 10.

A gas or air inlet 13 is positioned on one side of each of the gas chambers 11' of vessel 10 for the introduction into the system of the gaseous fluidizing medium under suitable pressure. Inlets 13 are in turn connected to a gas manifold 34 through suitable pressure or gas flow regulators 35 shown diagrammatically in Figure 1. Thus, gas velocity or pressure may be independently controlled for each gas chamber 11', whereby different gas velocities may be set up in different sections of the fluidizing vessel 10, if necessary, to maintain uniform fluidization throughout the vessel.

As indicated above, the provision of the plurality of gas chambers 11' proves advantageous in affording a means for selectively controlling the pressure or gas velocity in various portions of the fluidizing zone. However, the number of such units is determined in a large degree by the size of the fluidizing zone and to some extent is dependent upon the type of material treated. Variation in gas velocities in sections of the fluidizing zone are advantageous where changes in apparent density of the fluidized solids occur, for example, as the material is dried. Further, the necessity of disintegrating coherent wet solids in the feed end of the zone, and the avoidance of dust losses in the discharge end are factors favorably affected by plural gas chambers. However, with a relatively dry non-coherent feed a single gas chamber 11' will give very satisfactory results.

Valved discharge outlets 9 are provided at the bottom or apex of each gas chamber 11' for cleaning out pulverulent material such as fines which may have passed downwardly through the holes in perforated baffle 12, which is most likely to occur during shutdowns.

The top 14 of vessel 10 is provided with a feed inlet 15 for the material to be treated positioned near one end 16 of the vessel with respect to its length. A double doored closure 36 hinged to the sides of feed inlet 15 may be provided to prevent losses of dust and exit of moisture laden gases into the incoming feed. The closure is opened by the weight of the feed and closed by coiled springs 37. An open overflow outlet 17 for discharge of the treated solid material is located in the opposite end 18 somewhat below the top of the vessel 10. A tapered discharge spout or duct 19 is fixed to the end 18 of the vessel at the outlet 17 to receive the treated material overflow for directing it to other treating apparatus, car loading apparatus or the like. In this embodiment, the level of the fluidized body of solids is fixed by the position of the overflow outlet 17.

The heating means, as shown in Figure 1, and in detail in Figures 4 and 5, comprises a plurality of vertical banks of heating tubes 20 extending approximately horizontally and longitudinally throughout the lower portion of vessel 10 and positioned above the perforated plate or baffle 12. As shown in Figures 1 and 4, a sufficient number of banks are provided to occupy a major portion of the space within the vessel both longitudinally and transversely.

Each bank of tubes 20 is connected to a vertical manifold 21 at one end thereof and a manifold 22 at the other end. The tubes 20 of adjacent banks are vertically staggered for more efficient heat exchange with the solids being treated.

It will be noted from Figure 4, that the banks of tubes divide the flow path of the fluidized solids between infeed 15 and overflow outlet 17 into a series of narrow elongated passages, which passages are intercommunicating between adjacent tubes in a given bank throughout their vertical depth.

The manifolds 21 are in turn attached to a flanged header 23 located at the top of the manifolds through which a suitable fluid heating medium is introduced. Manifolds 22 are provided with a discharge header 24 at the bottom of each for removal of the heat exchange medium. As shown in Figure 1, the entire heating assembly is positioned within vessel 10 at a slight angle to the horizontal, so that when a condensible gas, such as steam, is utilized as the heating medium, the condensate will flow into manifolds 22 thereby facilitating removal through discharge header or condensate drain 24.

The vessel 10 is advantageously compartmentized into two sections, 5 and 6, by means of a vertical imperforate baffle 25 positioned transversely between feed inlet 15 and overflow outlet 17. The baffle is supported by the sides of vessel 10 and extends across the entire width of the vessel (as shown in Figure 2). Also, it extends from slightly below top 14 downwardly within the vessel to a point about midway through the depth of the heating tube banks. Below the level of the tube banks, the baffle 25 is provided with cut out portions or recesses to receive the several banks of tubes 20 extending across the width of the vessel. A plurality of narrow baffle extensions 26 are thus formed which extend downwardly between the heating tube banks. This construction causes the fluidized material to flow through substantially the entire depth of the tube banks in its passage from feed section 5 to discharge section 6.

At the top 14 of vessel 10, near end 18, a gas or fluidizing medium outlet 27 is provided through which moisture laden air in the case the use of the apparatus as a drier is discharged. The gas entering section 5 is discharged over the top of baffle 25 into section 6 and out of the vessel through outlet 27. Although not shown in the drawings, outlet 27 may connect with a suitable dust collector, such as a cyclone, to recover any entrained solids from the fluidizing gas.

Covered manholes or trapdoors 28 and 29 may be provided in the top 14 of vessel 10, if desired, for periodic cleaning or repair, if necessary. In addition, the vessel 10 may be provided with tubes 45 and 46 for reception of thermocouples or other temperature measuring devices.

In the modification shown in Figure 6 there is disclosed an arrangement for adjusting the location of the feed outlet and in turn for controlling the height of the fluent bed within vessel 10. According to this embodiment, there is provided feed outlet opening 38 in wall 18 of vessel 10 of substantially greater depth than required for proper discharge of treated solids. Preferably the outlet 38 has its bottom or lowermost level corresponding to the lowest desired level for the fluent bed, and has its uppermost level slightly above the highest desired level for the fluent bed. An adjustable weir 39 is positioned across opening 38 and is slidably supported by brackets 40 attached to wall 18. A threaded lug 41 extending outwardly from weir 39 receives a threaded rod 42 supported from the top of duct 19 by means of a nut or lug 43 and terminating in handwheel 44. Rotation of the wheel causes the weir 39 to move up or down in outlet 38, thus, serving as a means for controlling the height of the outlet, and in turn the height of the fluidized bed within the vessel. A discharge spout is provided to receive the treated feed in the usual manner.

The operation of the apparatus will be described with reference to the method of drying alumina trihydrate as it is received from the filters in a wet broken cake condition, even without substantial previous mechanical disintegration of the cake, although the method and apparatus of the invention is equally applicable to the heating or drying of any granular solids of the wide range of particle sizes which are sufficiently fine to be fluidized.

Wet alumina hydrate of suitable discrete or ultimate particle size is charged into section 5 of vessel 10 through feed inlet 15 onto the plate 12 until the upper level is somewhat below overflow outlet 17 forming a bed of appreciable depth. Steam or other heating medium is continuously passed into the heating tubes 20 through manifolds 21 and header 23 and condensate or cooled medium is removed through manifolds 22 and drain 24. Steam is preferred in drying alumina. The steam may be saturated steam at about 100–120 pounds per square inch, providing a steam temperature of about 335 to 345° F. giving a bed temperature of 250 to 260° F. Superheated steam may also be used.

A suitable fluidizing medium, such as air, preferably previously dried, is continuously introduced through inlets 13 from manifold 34 at a sufficient pressure and velocity so that after dissemination through the perforations of plate 12 the desired fluidity of the solids body is obtained, and a dense turbulent body of alumina hydrate through the depth of the bed in both sections 5 and 6 results.

The baffle 25 prevents the wet alumina hydrate which is continuously fed to section 5 of vessel 10 at a rate approximately equal to the rate of discharge of dried alumina hydrate through outlet 17, from moving toward the outlet until it has moved downwardly between the heating tube banks dividing the flow into several narrow passages, which are intercommunicating between tubes 20 in the banks. This provides a circuitous or tortuous flow passage of the wet alumina in a fluidized state through the major portion of the depth of the tube banks in both sections 5 and 6, and insures a complete drying before discharge from overflow outlet 17.

It is desirable to maintain in section 5 a substantial fluidized bed above tubes 20 so as to provide a disintegration zone or the like for disintegrating clods of alumina hydrate which may be fed to vessel 10. As previously pointed out the depth of the bed within sections 5 and 6 is controlled by the location of feed outlet 17.

The height of the fluent bed depends upon the height of disintegration zone desired, which with many materials is generally influenced by the amount of free moisture present. High moisture content in the case of alumina hydrate causes lumping and clodding. Thus, the modification shown in Figure 6 is very useful where it is necessary to increase the depth of the disintegration zone to accommodate a wet, sticky hydrate feed.

Thus, the fluidized alumina, as it dries, flows in a tortuous or circuitous path downwardly in section 5, horizontally in the lower portion of the bed underneath baffle 25, and upwardly in section 6 to the overflow outlet 17, where it is discharged as dry alumina hydrate containing less than 0.1% free moisture. Due to minimizing of any local overheating the dried alumina hydrate contains less insoluble alumina, analyzing less than 0.03% insolubles, as compared to 0.07% for alumina hydrate processed in a conventional manner. Heat transfer coefficients of up to about 160 B. t. u./hr./sq.ft./°F. are obtained.

In the above-described utilization of the method and apparatus, it is preferred to employ a gas velocity of 12 to 42 cubic feet per minute per square foot of cross sectional flow area in order to maintain the bed of alumina hydrate in a fluidized state of desired energy or agitation. The gas velocity is thus expressed to eliminate consideration of changes in gas density due to temperature changes, which would be necessary if velocities were expresesd in the conventional units of lineal movement per unit time. Of course, the gas velocity is subject to a wide range of values depending upon the particle size, particle shape, and the density of the material being treated, and in a typical alumina hydrate drying operation the following conditions prevailed:

Fluidizing air:
    Pressure at wind boxes    4 inches Hg
    Temperature at wind
        boxes _____ 60°–80° F.
    Flow _____ 12,000 S. C. F./hour The degree of fluidization, for example, a high energy or low energy bed, may suitably be controlled by varying the pressure of the fluidizing medium, or by providing a greater or lesser number of perforations per square foot in plate 12 or by varying the diameter of such perforations, thus varying the gas velocity. Accordingly, it is possible to selectively control the velocity of fluidizing medium flowing through gas chambers 11' by utilizing one or more of these modes of varying pressure.

For drying and heating other finely divided solids, the fluid heating medium may be gases other than steam, for example, stack gases, or preferably other condensible gases, or it may be a heated liquid or molten solid such as water, oil, melted sodium nitrate, and other heating liquids, depending upon the temperature desired.

Also the preferred embodiment as shown in the drawings may be modified to include more than one baffle such as baffle 25. In such case, the additional baffle or baffles are alternately positioned extending downwardly from slightly below the top 14 and upwardly from plate 12 of vessel 10, or as required, so that the material being treated is forced to flow in a tortuous path successively through the several sections from the feed inlet compartment to the outlet compartment.

The method and apparatus of the invention provide an improved means of drying or heating granular solids by indirect heat exchange and operates at optimum efficiency of heat exchange through the several combined features thereof. The fluidizing of the solids permits rapid and uniform heating thereof in a manner similar to the effect of agitation while heating a liquid. The confined or tortuous path of flow of the fluidized solids over the heating tubes causing downward horizontal and upward movement insures a complete heating and/or drying of the materials treated. The disposition of the heating tube banks across the width of the vessel with the tubes in staggered relation and forming restricted passages advantageously presents a maximum of heating surface to the fluosolids without unduly restricting the free movement thereof in vessel 10.

When the solids, such as wet alumina hydrate, are fed in the form of broken clods of filter cake onto the fluidized bed, they are quickly disintegrated into discrete particles that mix with the other undergoing drying.

Although the alumina hydrate drying operation as described herein is adapted to operate at atmospheric pressure, it is to be understood that the apparatus and method of the invention can be modified so as to operate at pressures either above or below atmospheric.

Also, as previously mentioned, the method of the invention can be carried out by employing a gas other than air as the fluidizing medium. For example, gases which are adapted for creating inert or other special atmospheres within the vessel may be employed, in which case it is generally desirable to compress them and recycle for further use.

In certain operations wherein the invention is used as a drier the moisture to be removed may be a solvent or the like which is desirably recovered. Such recovery may be effected by conventional recovery systems.

I claim:

1. A method of drying wet solids which comprises establishing and maintaining a dense turbulent bed of fluidized finely divided solids in a confined zone by passing a continuously flowing stream of gaseous medium therethrough at a predetermined velocity, continuously feeding finely divided solids into the bed of fluidized solids from a point in said zone above the level thereof, causing the fluidized solids constituting the dense turbulent bed to flow in a restricted tortuous path through said zone downwardly away from the point of infeed, laterally and then upwardly toward a discharge point at the level of the bed, heating said fluidized solids by indirect heat exchange while flowing in said tortuous path by passing the same in contact with a plurality of heat transfer surfaces positioned within the dense turbulent bed of solids, and continuously discharging the heated solids at the end of the upward portion of said tortuous path, while maintaining the level of said fluidized solids bed substantially above the heat transfer surfaces.

2. A method of drying finely divided solids which comprises establishing and maintaining a dense turbulent bed of fluidized finely divided solids within a confined zone by passing a continuously flowing stream of gaseous medium therethrough at a predetermined velocity, continuously feeding finely divided solids into the bed of fluidized solids, causing the fluidized solids to flow in a tortuous path downwardly away from the point of infeed, laterally and then upwardly toward a discharge point in said zone, dividing the flow of solids into a series of narrow intercommunicating streams within the tortuous path, heating the fluidized solids by indirect heat exchange while flowing in said narrow streams in the tortuous path, and continuously discharging dried solids from the zone at the end of the upward portion of said path, the discharge point in said zone being positioned substantially above the indirect heat exchange zone whereby the level of the bed of fluidized solids is maintained substantially above the indirect heat exchange zone.

3. A method according to claim 2 in which the finely divided solids are continuously fed into the bed of fluidized solids from a point in said zone above the level of said bed.

4. A method according to claim 2 in which the finely divided solids are continuously fed into the bed of fluidized solids from a point in said zone above the level of said bed and in which the end of the upward portion of the tortuous path is located at the level of the bed of fluidized solids.

5. An apparatus for drying finely divided solids comprising a vessel of elongated cross section adapted to hold finely divided fluidized solids, at least one gas chamber located at the bottom of said vessel, a perforated gas baffle interposed between said vessel and said chamber for distributively introducing a fluidizing gaseous medium into the vessel to establish and maintain therein a dense turbulent body of fluidized solids, an inlet for continuously feeding finely divided solids into said fluidized body positioned at one side of the vessel and above the level of the solids, a discharge overflow outlet for treated solids disposed in the vessel at the side longitudinally opposite said inlet and at the level of said body of fluidized solids, a baffle extending downwardly from above the level of fluidized solids into the lower portion thereof and separating the vessel into communicating inlet and discharge sections thereby causing the fluidized solids to flow in a tortuous path, indirect heating means comprising a plurality of vertical banks of tubes, said tubes of each bank being arranged in staggered relation to those of adjacent banks, said banks of tubes positioned at a depth substantially below the level of said fluidized solids and occupying a substantial portion of the intermediate space within the tortuous flow path of said solids and dividing the same into a series of restricted passages intercommunicating between adjacent tubes in each bank.

6. A method of drying wet solids of finely divided ultimate particle sizes which comprises establishing and maintaining a dense turbulent body of fluidized solids of a selected depth within a confined zone by contacting with a continuous flow of gaseous medium at fluidizing velocity, causing said fluidized solids to flow in a tortuous path through said zone by partially dividing said zone between the infeed and discharge points thereof, heating said fluidized solids while flowing in said tortuous path by contacting the same with a plurality of heat transfer surfaces in an intermediate portion of said flow path, feeding wet coherent solids into an upper portion of said body of fluidized solids, disintegrating the wet coherent solids into finely divided solids in said upper portion of the body prior to contact thereof with said heating surfaces, and regulating the depth of the upper portion of said body between the level thereof and the heating surfaces.

7. An apparatus according to claim 5 in which a plurality of independently and selectively controlled gas chambers are positioned longitudinally along the bottom of said vessel.

8. An apparatus according to claim 5 in which an adjustable weir means associated with the discharge overflow outlet is provided for regulating the level of the body of fluidized solids whereby the depth of said body above the heating tubes may be selectively controlled.

9. An apparatus for drying finely divided wet solids comprising a vessel adapted to hold fluidized finely divided solids, means for introducing a fluidizing gaseous medium into the vessel to establish and maintain therein a dense turbulent bed of fluidized solids, a baffle positioned within the vessel extending downwardly from above the level of the fluidized solids into the lower portion thereof, means for feeding finely divided solids into the vessel on one side of said baffle, means for discharging the dried finely divided solids from the vessel on the other side of said baffle, and indirect heat exchange means positioned in said vessel on both sides of said baffle, said indirect heat exchange means comprising plurality of banks of heating tubes, said banks of tubes being so disposed that a substantial portion of the space between the feeding means and discharge means is divided into a series of narrow laterally communicating passages, and said baffle having recesses in the lower portion thereof to receive the upper portions of the tube banks.

10. An apparatus for effecting indirect heat exchange with finely divided solids comprising a vessel adapted to hold finely divided fluidized solids, means for introducing a fluidizing gaseous medium into the vessel to establish and maintain therein a dense turbulent bed of fluidized solids, a baffle extending from above the level of the fluidized solids bed into the lower portion thereof and separating the vessel into communicating inlet and discharge sections, a discharge means positioned in the discharge section and controlling the depth of the fluidized solids bed in both sections, means for feeding finely divided solids into the vessel in the inlet section, and indirect heat exchange means positioned in said vessel in both sections and in the communicating space therebetween, said heating means in relation to the discharge means being disposed substantially lower in said vessel to maintain a substantial bed depth above the heating means in both the inlet and discharge sections.

11. A method for drying finely divided moisture-containing solids having a tendency to cohere and consolidate, which comprises feeding the solids to a confined zone, fluidizing the solids in said zone by passing therethrough a continuous flow of gaseous medium at velocities to establish and maintain a dense turbulent bed of solids, disintegrating the coherent solids portions of the feed into finely divided solids by agitation with the discrete particles of the fluidized solids bed in the feed portion of said zone, causing said finely divided fluidized solids to flow in a tortuous path through the remainder of said zone, and heating the finely divided fluidized solids while flowing in said tortuous path by contacting the same with a plurality of heat transfer surfaces.

12. A method according to claim 11 in which the moisture-containing solids are hydrated alumina.

JOHN E. MONTGOMERY.

REFERENCES CITED

The following references are of record in the file of this patent:

UNITED STATES PATENTS

| Number | Name | Date |
|---|---|---|
| 1,766,843 | Soderlund et al. | June 24, 1930 |
| 1,868,512 | Ahlmann | July 26, 1932 |
| 2,378,157 | Ramseyer et al. | June 12, 1945 |
| 2,419,245 | Arveson | Apr. 22, 1947 |
| 2,513,369 | Shaw | July 4, 1950 |
| 2,536,099 | Schleicher | Jan. 2, 1951 |